Aug. 14, 1928.
I. C. JENNINGS
1,680,381
APPARATUS FOR SUPPLYING DEHUMIDIFIED AIR TO ICE MAKING PLANTS
Filed March 13, 1925
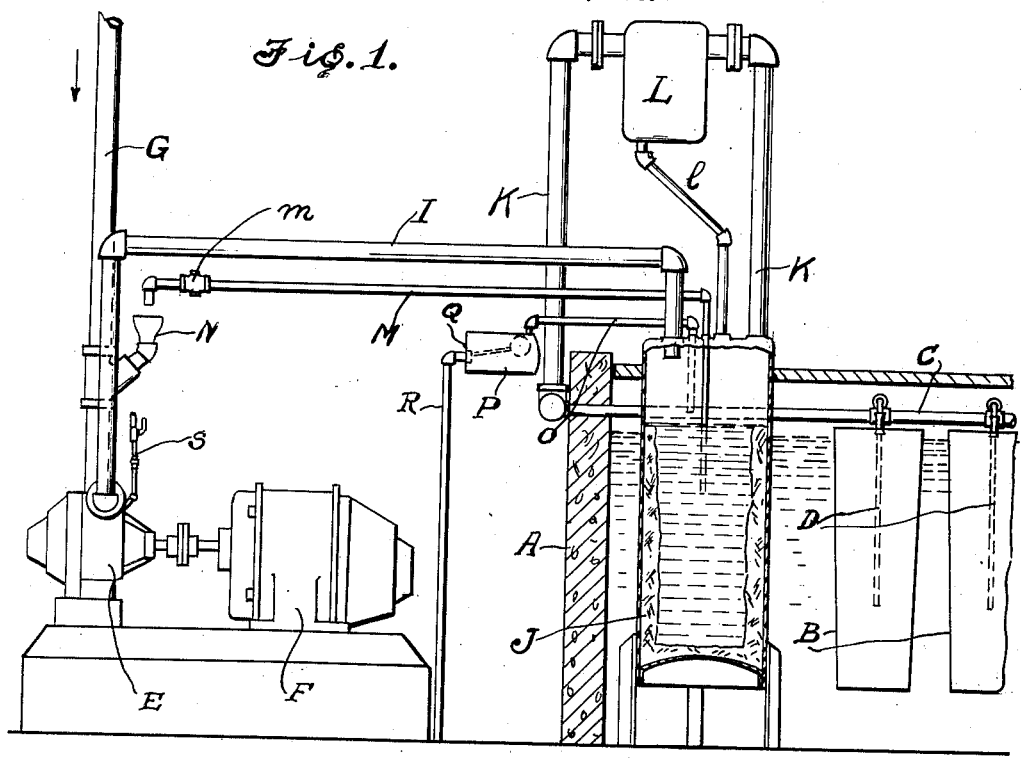
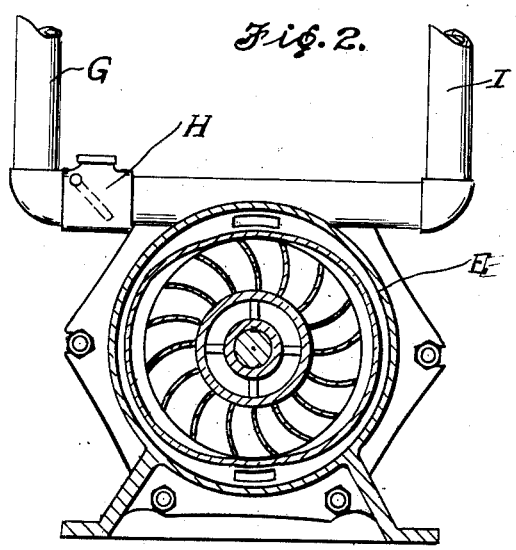
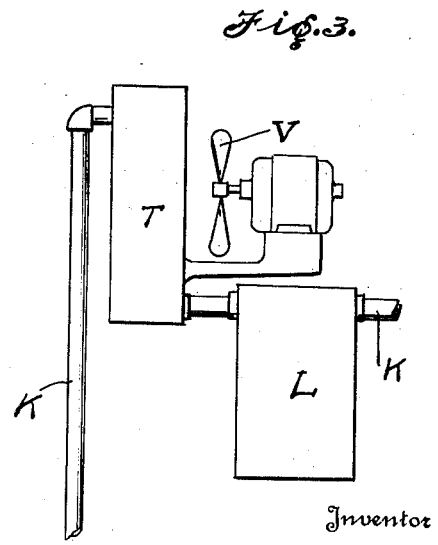
Inventor
*Irving C. Jennings*
By *Southgate Fay & Hawley*
Attorneys Patented Aug. 14, 1928.

1,680,381

UNITED STATES PATENT OFFICE.

IRVING C. JENNINGS, OF SOUTH NORWALK, CONNECTICUT.

APPARATUS FOR SUPPLYING DEHUMIDIFIED AIR TO ICE-MAKING PLANTS.

Application filed March 13, 1925. Serial No. 15,416.

An ice-making plant consists of a number of cans, which are submerged in a vat or tank containing brine, which is cooled by allowing a refrigerating medium, which has been compressed into liquid form, to expand into vapor in coils in the brine tank.

The ice cans are filled with pure water, which is frozen into ice. It is customary to insert small air pipes or tubes down into the ice cans, through which air is blown to agitate the water to expedite the freezing process and to improve the quality of the ice.

These tubes are drawn out of the ice cans just before the cakes are completely solidified or they are allowed to freeze into the cakes.

Difficulty is experienced in using these tubes, as the connections extending thereto and the tubes themselves by their submergence in the ice cans are subjected to low temperature, and if there is moisture in the air fed into the air system, the connections and tubes are apt to freeze up as the temperature of the air is reduced, which, of course, interferes with and stops the operation.

Attempts have been made to remedy this defect by using dehumidifiers. This has not been altogether successful as it is difficult to arrange dehumidifiers to work to produce a constant result.

The object of my invention is to provide a new and simplified apparatus for supplying evenly dehumidified air for the purpose stated. To do this, I employ a hydro-turbine air pump to compress the air, and I cool the water that is used in the pump so that the air will be cooled in the pump and will pass from the pump at a low temperature, whereby any water contained in the air can be separated therefrom and whereby when the air is subjected to the low temperature in the brine tank and ice cans, there will be no further precipitation.

The apparatus, which I preferably use for cooling the water, comprises a cooling tank cooled by the brine as by submergence in the brine tank, and connected to the hydro-turbine pump, so that the water used in the pump will be circulated and maintained at a substantially constant temperature. The air passing from the pump preferably is led through the top of the cooling tank so that any water which can separate therefrom will drop into the tank, and the air passing from the cooling tank may be led through a separator before passing to the ice-making plant to dehumidify the same still further.

The apparatus is illustrated in the accompanying drawing in which,

Figure 1 is a sectional diagrammatic view illustrating an apparatus for practicing my invention;

Fig. 2 is a cross sectional elevation on an enlarged scale of the hydro-turbine air pump that I use for compressing the air; and Fig. 3 is a diagram showing an additional air warming device that may be used, if desired.

Referring to the drawing and in detail, A designates the brine tank in which the ice cans B are submerged. A system of air piping C is arranged in the tank above the ice cans, and air pipes or tubes D are connected to this system to extend down into the ice cans. E designates the hydro-turbine air pump or compressor, which is used and which may be driven by an electric motor F.

Any hydro-turbine air pump may be employed, but the one I preferably use is constructed along the lines of patent granted in my name, May 18, 1919, No. 1,297,692, Rotary compressor.

This compressor consists of a bladed rotor revolving in an elliptical casing filled with water. As the rotor rapidly turns, the blades force the water to rotate in the casing. As this rotation takes place as the casing is elliptical and the rotor is circular, the water will leave the pockets or displacement chambers formed between the blades of the rotor at the wide points of the casing and will be forced back into these displacement chambers at the narrow parts of the casing.

Inlet ports are provided in the side of the casing through which the water pulls the air as it leaves the displacement chambers creating a vacuum, and the air is carried around to the narrow parts of the casing where the water is again forced into the displacement chambers and the air is ejected through the outlet ports by the reentering water.

It will be seen that the air comes into very intimate contact with the water during the compression of the same in the pump. By using cold water in the pump, the air issuing from the pump instead of being warmed or heated as in an ordinary air compressor, will be cooled to a very low temperature.

The air is supplied to the pump by an air inlet pipe G, which preferably has a check valve H, opening towards the pump to prevent back flow of air through the pump when the same is shut down.

I designates the air outlet pipe extending from the pump. J designates a cooling tank which is cooled by the brine.

It is preferred to submerge the cooling tank directly in the brine tank. In some instances, however, the cooling tank may be arranged in a receptacle outside of the brine tank and the brine led into this additional receptacle. The water in the cooling tank may be kept at a low temperature by any other suitable arrangement.

The pipe I connects to the top of this cooling tank J, and another pipe K extends from the top of the same and is connected to the air piping system C.

A separator L may be interposed in the pipe K at some height above the cooling tank J, if desired, and a drain pipe l may extend from the separator back to the top of the cooling tank to return any water that can be separated from the air after it leaves the cooling tank. This separator L is not always used but is desirable in large plants. A pipe M extends down into the cooling tank J and is carried over to position to supply cold water to the pump inlet.

A branch connection N having a funnel-shaped mouth is arranged in the air inlet pipe G to the hydro-turbine pump. The pipe M is provided with a control or regulating valve m so that the amount of water passing through the same to the funnel can be regulated. A restricted orifice is sometimes used in this pipe instead of the valve. The break in the cold water supply to the pump is made so that there will be no tendency for the water to siphon over from the cooling tank or for the pump to draw in the water. By using the valve or orifice, the amount of cold water passing to the pump can be very accurately regulated. Preferably more water is fed to the pump than is required for its operation, so that there will be a circulation between the cooling tank and pump.

As the air coming in through the inlet G contains water which will be precipitated as the air is cooled, a small amount of water will be continuously added to the system from this source.

It is desirable to keep the cooling water at an exact height in the cooling tank and to do this a pipe O extends down into the tank and stops at the desired level. This pipe O connects to a small pot or trap P, which has a float-controlled valve Q connecting the tank to a drain pipe R.

The compressed air in the top of the cooling tank J will force water over into the trap P, when the level of the same gets above the end of the drain pipe O, and as this water accumulates in the trap P it will be allowed to escape. Thus the water in the cooling tank will be kept at a constant level.

A valved water supply pipe S may connect the inlet of the pump to city water or any source of water supply for giving the system its initial supply.

In operation, ice will form on the sides of the cooling tank J. The cooling water in regulated amount, will pass over to the hydro-turbine air pump or compressor. This cooling water will be supplied at about the temperature of melting ice—32° F.

As this water is brought into intimate contact with the air during the compressing action in the pump, the air will be cooled to a low temperature, say about 40° F.

In some installations it is desirable to cool the air below 32° F., or freezing temperature of water. In such cases brine or any other suitable non-freezing liquid may be used in the air pump instead of water.

As the cooled air passes through the top of the cooling tank and also through the separator L, if the latter is used, the moisture which is in the air, and which was precipitated by the cooling action, will separate out and will drop into the cooling tank. The air thus passing to the air system C will be dehumidified and will be at a low temperature of, say, about 40° F.

This use of cold water in the compressor usually will sufficiently dehumidify the air, although in some instances and special locations I contemplate using an additional dehumidifier in the air pipe passing from the pump to the air system.

Thus, as the air is led into the air supply system in the brine tank and the air pipes or tubes, there will be no precipitation of moisture, and hence freezing of moisture in the air pipe system C or tubes will be prevented.

As the air comes into the cooling tank, it will be slightly warmer than the cooling water or the inside of the cooling tank, and hence the same, with the aid of the increasing resistance to heat flow as the ice which forms on the inside surfaces of the tank becomes thicker, will stop the solid freezing of the cooling water in the cooling tank, and after the device gets into operation, the layer of ice in the cooling tank will be maintained at a substantially uniform thickness.

Thus, by cooling the air in the compressor, by allowing the precipitated water to separate from the air, and by then passing the cool dehumidified air to the air system and tubes. freezing and choking of the air system and tubes is prevented.

In some processes of freezing, it is desirable to warm the air before it is passed into the cans so as to prevent "snow balling" in the middle of the cakes of ice.

If it is desired to heat the dehumidified air passing from the cooling tank, this can be done by leading the air after the same has been cooled and the moisture separated therefrom, through a radiator or coil T through which warm air can be blown by a fan V. As the air when heated this way cannot take in any additional moisture, the advantages before pointed out, namely, that of preventing the precipitation and freezing of moisture in the air system and tubes, will still be obtained.

The details and arrangements herein shown and described may be greatly varied by a skilled mechanic without departing from the scope of my invention as expressed in the claims.

Having thus described my invention, what I desire to obtain by Letters Patent, is:

1. The combination of an ice making plant comprising a tank for containing a cooling medium such as brine, ice cans therein, air supply tubes extending into the ice cans, and means for supplying air to the tubes, consisting of a hydro-turbine pump connected to said tubes for compressing the air, and means for cooling the liquid that is used in the pump.

2. The combination of an ice making plant comprising a tank for containing a cooling medium such as brine, ice cans therein, air supply tubes extending into the ice cans, and means for supplying air to the tubes, consisting of a hydro-turbine pump for compressing the air, means for cooling the liquid that is used in the pump, consisting of a cooling tank for submergence in the brine of the ice-making plant, and connections between the hydro-turbine pump and the cooling tank.

3. The combination of an ice making plant comprising a tank for containing a cooling medium such as brine, ice cans therein, air supply tubes extending into the ice cans, and means for supplying air to the tubes, consisting of a hydro-turbine pump, a cooling tank for submergence in the brine, a connection for supplying water from the cooling tank to the pump, an air pipe extending from the pump to the top of the cooling tank, and another pipe extending from the top of the cooling tank to the plant.

4. The combination of an ice making plant comprising a tank for containing a cooling medium such as brine, ice cans therein, air supply tubes extending into the ice cans, and means for supplying air to the tubes, consisting of a hydro-turbine pump, a cooling tank for submergence in the brine, a connection for supplying water from the cooling tank to the pump, a break in this connection, and an air pipe extending from the pump to the plant.

5. The combination of an ice making plant comprising a tank for containing a cooling medium such as brine, ice cans therein, air supply tubes extending into the ice cans, and means for supplying air to the tubes, consisting of a hydro-turbine pump, a cooling tank for submergence in the brine, a connection for supplying water from the cooling tank to the pump, a regulating valve or orifice in this connection, and an air pipe extending from the pump to the plant.

6. The combination of an ice making plant comprising a tank for containing a cooling medium such as brine, ice cans therein, air supply tubes extending into the ice cans, and means for supplying air to the tubes, consisting of a hydro-turbine pump, a cooling tank for submergence in the brine, a connection for supplying water from the cooling tank to the pump, an air pipe extending from the pump to the top of the tank, another pipe extending from the top of the tank, another pipe extending from the top of the tank to the plant, and a drain pipe having a float-controlled trap for maintaining a constant level of water in the cooling tank.

7. The combination of an ice making plant comprising a tank for containing a cooling medium such as brine, ice cans therein, air supply tubes extending into the ice cans, and means for supplying air to the tubes, consisting of a hydro-turbine pump, a cooling tank for submergence in the brine, a connection for supplying water from the cooling tank to the pump, an air pipe extending from the pump to the plant, and a separator arranged in this air pipe, and having a drain connected to the cooling tank.

8. The combination of an ice making plant comprising a tank for containing a cooling medium such as brine, ice cans therein, air supply tubes extending into the ice cans, and means for supplying air to the tubes, consisting of a hydro-turbine pump, a cooling tank for submergence in the brine, a connection for supplying water from the cooling tank to the pump, an air pipe extending from the pump to the top of the can, another pipe extending from the top of the can to the plant, a separator in this pipe, and a drain extending from the separator to the tank.

9. The combination of an ice making plant comprising a tank for containing a cooling medium such as brine, ice cans therein, air supply tubes extending into the ice cans, and means for supplying air to the tubes, consisting of a hydro-turbine pump, a cooling tank for submergence in the brine, a connection for supplying water from the cooling tank to the pump, an air pipe extending from the pump to the tank, another pipe extending from the top of the tank to the plant, a separator in this pipe, a drain extending from the separator to the top of the tank, and a drain extending from the tank, having a float-controlled trap.

10. The combination of an ice making plant comprising a tank for containing a cooling medium such as brine, ice cans therein, air supply tubes extending into the ice cans, and means for supplying air to the tubes, consisting of a hydro-turbine pump, a cooling tank, a connection for supplying cooling water from the cooling tank to the pump, an air pipe extending from the pump to the plant, and means for warming the dehumidified air.

In testimony whereof I have hereunto affixed my signature.

IRVING C. JENNINGS.